(12) United States Patent
Tanaami (10) Patent No.: US 8,864,301 B2
(45) Date of Patent: Oct. 21, 2014

(54) RECORDING APPARATUS, ROTARY MEMBER SUPPORT APPARATUS, AND DRIVE TRANSMISSION APPARATUS

(75) Inventor: Yasufumi Tanaami, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 160 days.

(21) Appl. No.: 13/342,618

(22) Filed: Jan. 3, 2012

(65) Prior Publication Data

US 2012/0169817 A1 Jul. 5, 2012

(30) Foreign Application Priority Data

Jan. 5, 2011 (JP) ................................. 2011-000637

(51) Int. Cl.
| | | |
|---|---|---|
| *B41J 2/01* | (2006.01) | |
| *B41J 23/02* | (2006.01) | |
| *F16C 17/02* | (2006.01) | |
| *F16H 33/20* | (2006.01) | |
| *B41J 13/076* | (2006.01) | |
| *F16H 57/021* | (2012.01) | |

(52) U.S. Cl.
CPC ................ *B41J 13/076* (2013.01); *B41J 23/02* (2013.01); *F16C 17/02* (2013.01); *F16H 57/021* (2013.01); *F16H 33/20* (2013.01); *F16H 2324/16* (2013.01)
USPC ........................................................ 347/104

(58) Field of Classification Search
CPC ....... F16C 33/20; F16C 57/021; F16C 13/076
USPC .................. 347/104; 384/428, 435, 538, 543; 474/197, 199, 902, 903
See application file for complete search history.

(56) References Cited

U.S. PATENT DOCUMENTS 5,845,175 A * 12/1998 Kumar et al. .................. 399/111
5,855,455 A * 1/1999 Williford et al. ............. 405/196

FOREIGN PATENT DOCUMENTS

| | | | |
|---|---|---|---|
| JP | H07-293671 A | | 11/1995 |
| JP | H11-351260 A | | 12/1999 |
| JP | 2006-035613 A | | 2/2006 |
| KR | 2006117657 A | * | 11/2006 |

* cited by examiner

*Primary Examiner* — Matthew Luu
*Assistant Examiner* — Tracey McMillion
(74) *Attorney, Agent, or Firm* — Canon USA Inc IP Division

(57) ABSTRACT

A rotary member support apparatus includes a rotary member configured to receive a force in a radial direction and having at a rotation center a cylindrical bearing portion, and a support shaft to be inserted into the bearing portion, wherein the support shaft is formed so as to have at least two protrusions including curved surfaces internally touching the bearing portion of the rotary member.

19 Claims, 5 Drawing Sheets

RECORDING APPARATUS, ROTARY MEMBER SUPPORT APPARATUS, AND DRIVE TRANSMISSION APPARATUS

BACKGROUND OF THE INVENTION

1. Field of the Invention

The present invention relates to a shaft configuration of an idler gear in a conveyance unit of a recording apparatus.

2. Description of the Related Art

Among recording apparatuses such as printers, there exists a serial recording apparatus in which a recording head is mounted on a carriage configured to move in a direction orthogonal to a sheet conveyance direction, with sheet conveyance and recording on a sheet by the recording head being performed alternately.

In such a recording apparatus, a conveyance roller is arranged on the upstream side and a discharge roller is arranged on the downstream side of the recording head with respect to the sheet conveyance direction. To secure the requisite accuracy in sheet conveyance, the conveyance roller is equipped with a code wheel for detecting the rotation amount thereof and the recording apparatus main body is equipped with an encoder serving as a detection unit thereof.

Further, there exist three conveyance modes: a first mode in which sheet conveyance is performed solely by the conveyance roller at the sheet leading edge portion; a second mode in which sheet conveyance is performed by both rollers at the sheet central portion; and a third mode in which sheet conveyance is performed solely by the discharge roller at the sheet trailing edge portion. Recording is performed in each mode.

Due to limitations in terms of cost and space, there are many apparatuses in which, instead of being driven separately, the conveyance roller and the discharge roller are connected together by gears and driven by a single drive source. In this case, depending on the distance between the two rollers, a plurality of idler gears are arranged between the gears respectively provided on them, thereby effecting drive connection.

In such a construction, however, even when sheet conveyance is performed solely by the discharge roller after the sheet has left the conveyance roller, the conveyance amount is controlled based on the information of the code wheel provided on the conveyance roller. Thus, when the attitude of the idler gears is unstable as in the case, for example, of movement on the peripheral surface of a rotation shaft, the transmission accuracy of the gears deteriorates, which leads to deterioration in conveyance accuracy.

In view of this, there has been proposed a construction in which the support shaft of each idler gear is not a round shaft as in the prior art but one of an oval cross-sectional configuration consisting of flat portions and arcuate portions, and the gear inner peripheral surface is supported by two connection portions between the flat portion and the arcuate portions, whereby the attitude of the gear is stabilized.

However, the shaft as discussed in Japanese Patent Application Laid-Open No. 2006-35613 is formed by flat portions and arcuate portions, which means the a large portion has to be cut off in order to form the flat portion. Thus, as compared with an ordinary shaft, the shaft is thinner, with its strength being rather lower. This reduction in strength leads to an increase in the deflection of the shaft, which causes the gear to be deviated from a predetermined position, resulting in deterioration in transmission accuracy.

In a case where, instead of mounting a metal shaft to a metal plate as in Japanese Patent Application Laid-Open No. 2006-35613, a shaft is integrally formed with a molded frame taking the cost into consideration, forming the shaft in an oval cross-sectional configuration as in Japanese Patent Application Laid-Open No. 2006-35613 results in a further increase in shaft deflection, resulting in further deterioration in transmission accuracy.

An attempt to arrange the two support portions away from each other (in a wide angle with each other), the portion that has to be cut off in order to form the flat portion further increases. Thus, when the strength of the shaft is taken into account, there are limitations in terms of the arrangement of the support portions.

Further, when chamfering or rounding is effected in the case where the boundaries between the flat portion and the arcuate portions serve as the support portions, the gear will be deviated from the predetermined position. If wear is taken into account, although the degree of roundness should be larger, that would further increase the deviation of the gear from the predetermined position, making it difficult to secure a large degree of roundness.

SUMMARY OF THE INVENTION

One of the aspects of the present invention is directed to a recording apparatus, a rotary member support apparatus, and a drive transmission apparatus capable of suppressing a reduction in shaft strength, thus preventing deterioration in the transmission accuracy of a gear train.

According to an aspect of the present invention, a rotary member support apparatus includes a rotary member configured to receive a force in a radial direction and having at a rotation center a cylindrical bearing portion, and a support shaft inserted into the bearing portion, wherein the support shaft is formed having at least two protrusions including curved surfaces internally touching the bearing portion of the rotary member.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
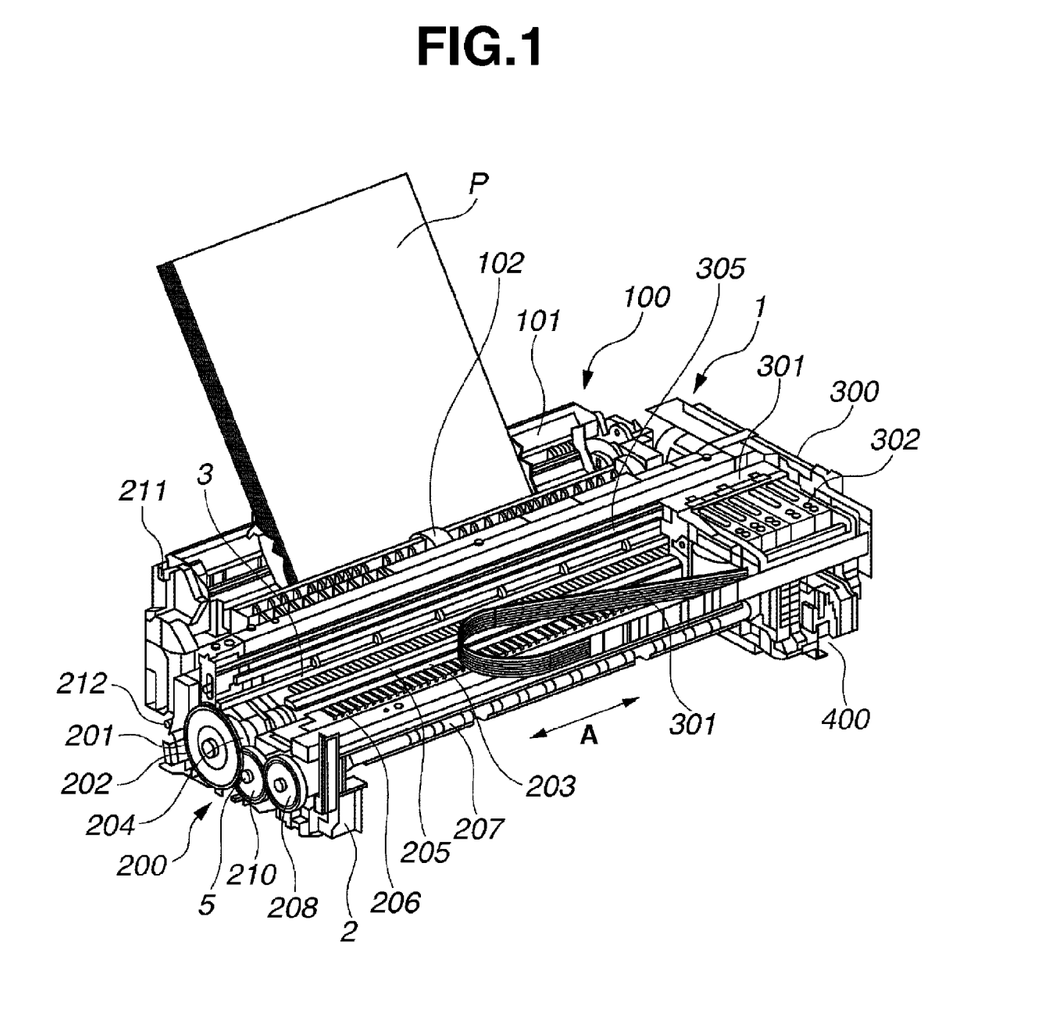
FIG. 1 is a perspective view of an entire construction of a recording apparatus according to an exemplary embodiment of the present invention.
Figure 2:
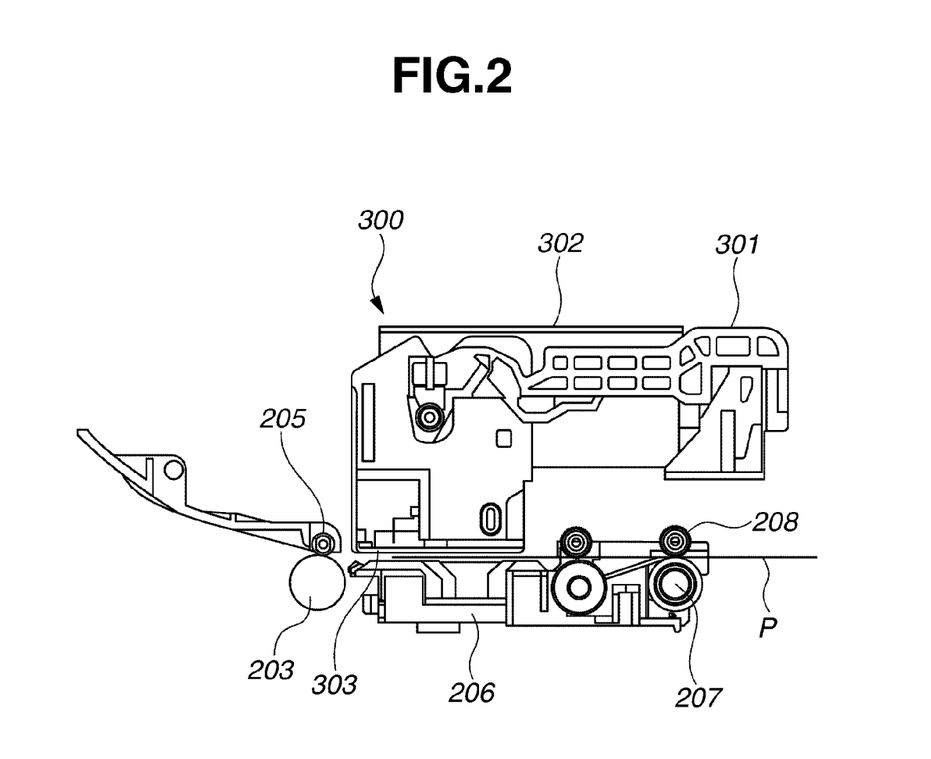
FIG. 2 is a side sectional view of a sheet conveyance unit and a recording unit.

FIG. 1 is a perspective view of an entire construction of a recording apparatus according to an exemplary embodiment of the present invention, and FIG. 2 is a side sectional view of a sheet conveyance unit and a recording unit. In the present exemplary embodiment, the recording apparatus is a so-called ink jet recording apparatus configured to form an image by discharging ink in the form of droplets onto a shaft.

A recording apparatus 1 includes a sheet feeding unit 100, a sheet conveyance unit 200, a recording unit 300, and a recovery unit configured to perform maintenance on the recording unit. Sheets P serving as recording media stacked on a pressure plate 101 of the sheet feeding unit 100 are conveyed one by one to the sheet conveyance unit 200 by a sheet feeding roller 102 and a separation mechanism (not shown).

Each sheet P conveyed by the sheet conveyance unit 200 is conveyed to the downstream side while being held between a conveyance roller 203 that is a conveyance unit configured to be driven by a driving motor 201 via a timing belt 202, and a pinch roller 205 held in press contact with the conveyance roller 203. A platen 206 is arranged on the downstream side of the conveyance roller 203.

The platen 206 serves to support the lower surface of the sheet P and to maintain a fixed distance between itself and the recording unit 300 equipped with a recording head serving as the recording unit. After the recording by the recording unit 300, the sheet P is held between a discharge roller 207 that is a conveyance unit and a spur 209 in press contact therewith, and discharged to the exterior of the recording apparatus 1.

The driving force of the driving motor 201 is transmitted to the discharge roller 207 via a gear train consisting of a conveyance roller gear 204 coaxially fixed to the conveyance roller 203, an idler gear 210, and a discharge roller gear 208 coaxially fixed to the discharge roller 207. Thus, the discharge roller 207 is rotated in synchronism with the conveyance roller 203.

A code wheel 211 is coaxially fixed to the conveyance roller 203, and the rotation amount of the conveyance roller 203 is detected by an encoder 212 provided on a frame 2. The detected value is transferred to a control unit (not shown), and the conveyance amount of the sheet P is controlled based on the value.

As described above, the conveyance roller 203 is urged by the pinch roller 205, the discharge roller 207 is urged by an urging member (not shown), so that their respective rotation centers do not move.

The idler gear 210 is rotatably fitted into a support shaft 4 (not shown; described below) provided integrally with the frame 2. No urging member working in the radial direction is provided on the idler gear 210, and the idler gear 210 is movable in the radial direction with respect to the support shaft 4. Its axial movement is regulated by a stopper 5.

A reason for this construction is as follows: first, if the shaft 4 inclines, when the idler gear 210 moves in the axial direction, the position of the idler gear 210 also changes along the falling, with the result that deviation is generated in the positional relationship between the conveyance roller gear 204 and the discharge roller gear 204. This deviation constitutes a cause of transmission error degeneration.

When a flange is integrally formed on the conveyance roller gear 203 and the discharge roller gear 207, it may occur that the tooth surfaces are not formed in a normal configuration at the connection portion between the gear and the flange. When the tooth surfaces are brought into mesh at this portion, the transmission accuracy may deteriorate.

Further, if the idler gear 210 is brought into contact with this flange, the transmission accuracy may deteriorate. For this reason, the movement in the axial direction is regulated by the stopper 5.

The recording unit 300 includes an ink tank 302 for storing ink, a recording head 303 configured to perform recording by discharging ink supplied from the ink tank 302 in the form of droplets onto the sheet P, a carriage 301 on which these components are mounted, a flexible cable 304 used to perform data transmission to and from the control unit, etc.

A driving belt 305 is fixed to the carriage 301, and the carriage 301 reciprocates along a guide rail 3 in a direction orthogonal to the conveyance direction A of the sheet P by a driving motor (not shown).

In performing recording on the sheet P by the recording unit 300, an image is formed on the sheet P by repeating the operation of the conveyance unit 200, which is configured to stop each time it has conveyed the sheet P by a fixed amount to perform a so-called intermittent conveyance, the reciprocating operation of the recording unit 300, and the operation of discharging ink from the recording head, which is performed simultaneously therewith.

In the state as illustrated in FIG. 2, the sheet P is held solely between the discharge roller 206 and the spur 209. The sheet P is not in contact with the conveyance roller 203, so that the sheet conveyance amount is the rotation amount of the discharge roller 206.

The rotation amount of the discharge roller 206 is transmitted to the conveyance roller 203 via the idler gear 210, and is detected by the code wheel 211 mounted on the conveyance roller 203, which means there may be involved a gear transmission error. Thus, to perform a sheet conveyance of high accuracy in this state, it is necessary to reduce as much as possible the gear transmission error.

Next, a shaft configuration to prevent a change in the attitude of the idler gear, which is one cause of the gear transmission error, and stabilizing the attitude, will be described.

Figure 3:
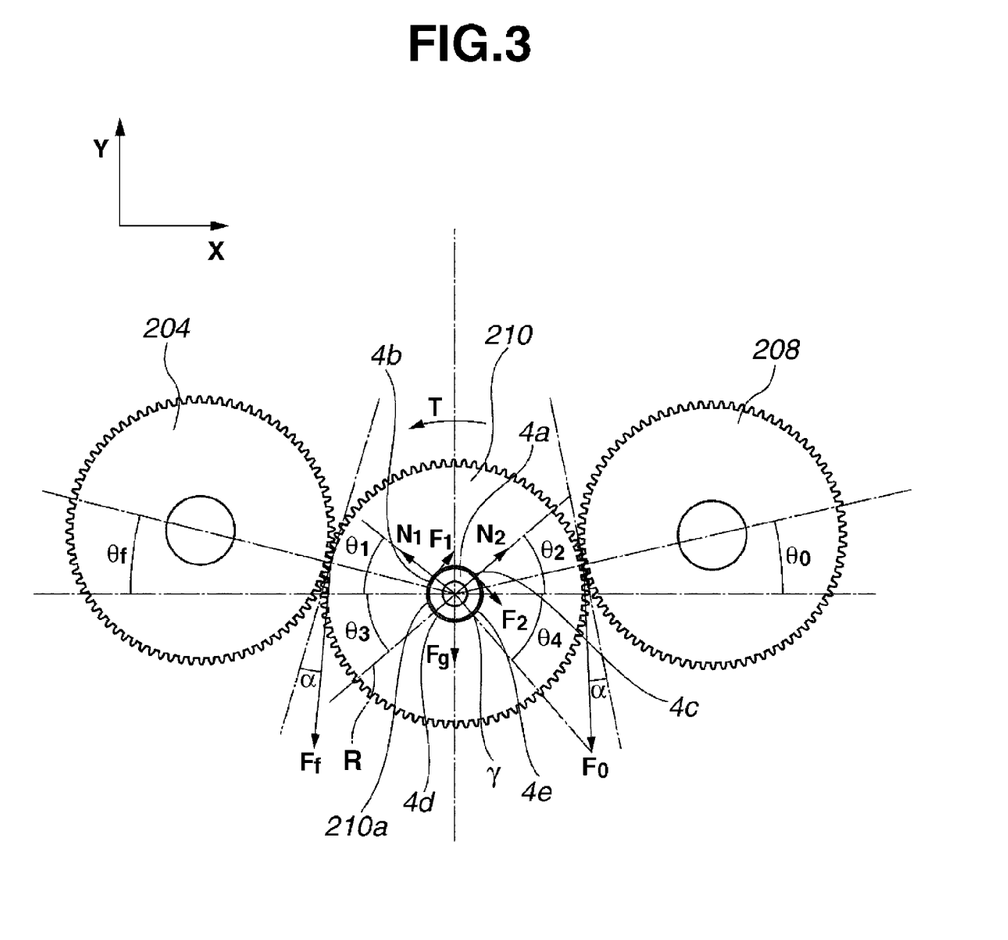
FIG. 3 is a side view of a gear train.
Figure 4:
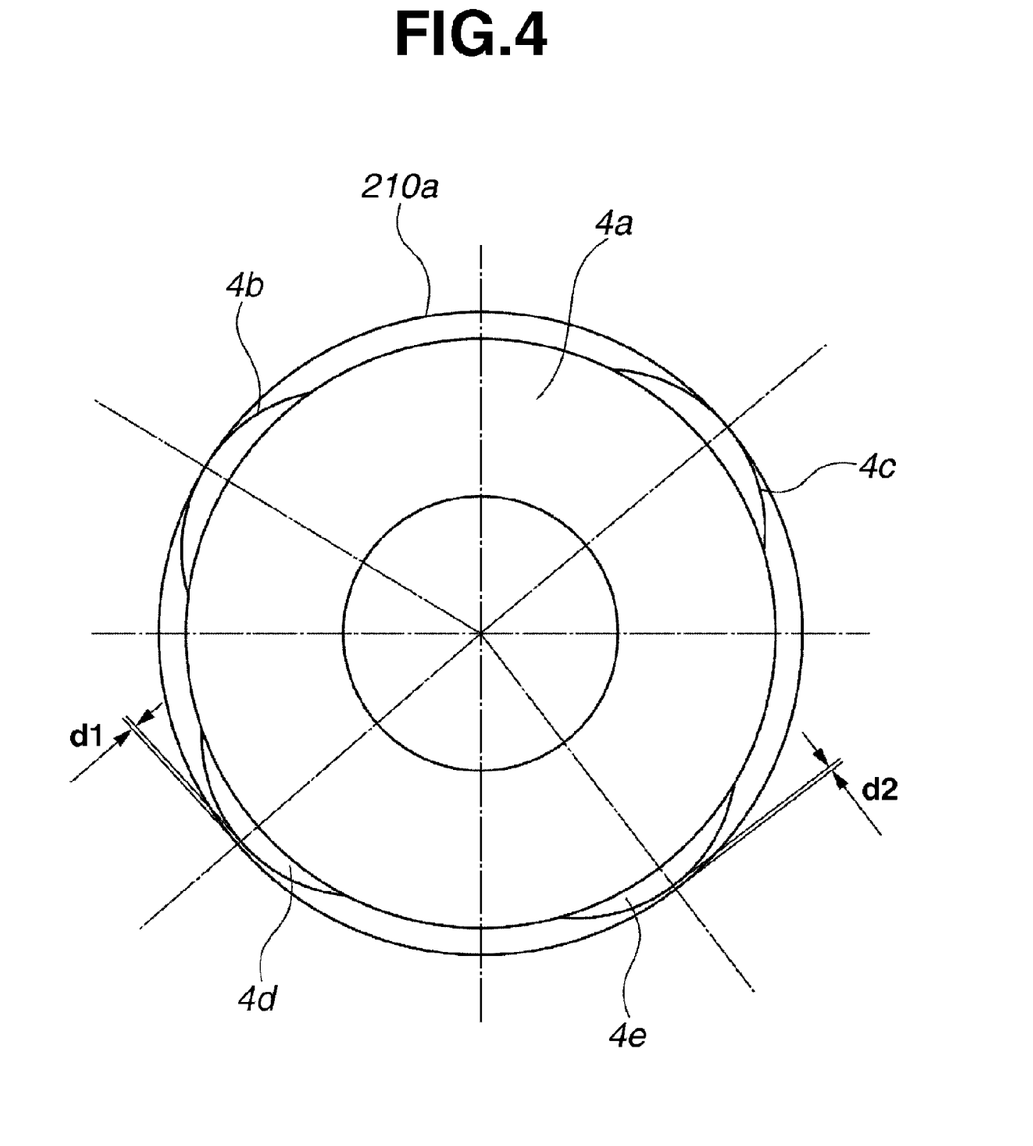
FIG. 4 is an enlarged view of the support shaft portion of an idler gear.

FIG. 3 is a side view of a gear train serving as a drive transmission apparatus, and FIG. 4 is an enlarged view related to a rotary member support apparatus for an idler gear, which is the rotary member.

An idler gear 210 transmits the rotational force of a conveyance roller gear 204 to a discharge roller gear 208. A support shaft 4 is fixed in position so as not to rotate to the apparatus main body side. The support shaft 4 is fitted into a circular shaft hole at the rotation center of the idler gear 210.

The support shaft 4 is formed by a cylindrical portion 4a, which is a cylindrical or columnar base portion, and four protrusions 4b, 4c, 4d, and 4e, which are protrusions radially protruding from the cylindrical portion 4a.

Each protrusion 4b, 4c, 4d, 4e is of a ridge-like configuration extending in the same sectional configuration in the longitudinal direction of the support shaft 4. Alternatively, each protrusion is formed in a semi-cylindrical configuration (though not so exactly) extending in the longitudinal direction of the support shaft 4. The support shaft is formed of a molding material. That is, the shaft is a resin molding formed by a mold.

As described referring to FIG. 1, in this case, the sheet P is conveyed in the conveyance direction A, and the idler gear 210 rotates in a main rotating direction indicated by symbol T, i.e., counterclockwise.

In the state in which driving force is received from the conveyance roller gear 204 (the driving side gear, also referred to as a first gear) and in which the driving force is transmitted to the discharge roller gear 208 (the driven side gear, also referred to as a second gear), two protrusions 4b and 4c internally touch the inner peripheral surface 210a of the shaft hole of the idler gear 210, and the other protrusions 4d and 4e form predetermined gaps d1 and d2 between them and the inner peripheral surface 210a of the shaft hole of the idler gear. The inner peripheral surface 210a of the idler gear 210 is in line contact with the distal end portions of the protrusions 4b and 4c of the support shaft 4.

Usually, in the case where the support shaft is around shaft, the position of the idler gear 210 is determined by the position of the support shaft 4. That is, the center of the support shaft is the point of intersection of an arc whose radius is a value obtained by adding a proper backlash value to the sum of the pitch circle radius of the conveyance roller gear 204 as measured from the center of the conveyance roller gear 204 and the pitch circle radius of the idle gear, and an arc whose radius is obtained by adding a proper backlash value to the sum of the pitch circle radius of the discharge roller gear 207 as measured from the center of the discharge roller gear 207 and the pitch circle radius of the idle gear.

However, it is general practice to provide a fixed gap between the support shaft and the gear hole (bearing portion), so that there is the possibility of the rotation center of the gear being deviated from the center of the support shaft as set above.

In the present exemplary embodiment, an arrangement in which the center of the idler gear 210 is the point of intersection of the above-described two arcs, is defined as the predetermined position of the idler gear, and the protrusions 4b and 4c are formed so as to touch the inner peripheral surface 210a of the idler gear 210 in this predetermined position. Thus, in the rotating direction, there is generated no such deviation of the center position as described above, and the transmission accuracy is not affected.

Here, the above definition of the predetermined position of the idler gear is only given by way of example. For example, regarding the backlash, instead of adding the backlash to the inter-shaft distance as described above, it is also possible to realize a proper backslash through a reduction in tooth thickness.

In this case, the predetermined position of the idler gear is an arrangement in which the point of intersection of the two arcs drawn from the respective centers of the conveyance roller and the discharge roller, with the inter-shaft distance remaining as the sum of the pitch circle radiuses of the connected gears. Note that, in this way, the predetermined position of the idler gear can be defined in various ways depending upon the way the design is made.

The optimum positions of the protrusions 4b and 4c, and the respective angles θ1 and θ2 as measured from the horizontal plane can be obtained from the balance equation of force and moment as illustrated in FIG. 3. While the detailed explanation of the symbols will be separately given below, symbol μ indicates the dynamic coefficient of friction of the idler gear 210 and the support shaft 4, symbol a indicates the pressure angle of the gear, and symbol Fg indicates the weight of the idler gear 210.

The balance of forces is as follows in the X-direction and the Y-direction in FIG. 3:

$$-Ff \cdot \sin(\theta f - \alpha) + Fo \cdot \sin(\theta o - \alpha) + \mu \cdot N1 \cdot \sin\theta 1 + \mu \cdot N2 \cdot \sin\theta = N1 \cdot \cos\theta 1 - N2 \cdot \cos\theta 2 \quad \text{(X-direction)}$$

$$-Ff \cdot \cos(\theta f - \alpha) + Fo \cdot \cos(\theta o - \alpha) + \mu \cdot N1 \cdot \cos\theta 1 - \mu \cdot N2 \cdot \cos\theta 2 = \mu \cdot N1 \cdot \sin\theta 1 - N2 \cdot \sin\theta 2 + Fg \quad \text{(Y-direction)}$$

The moment balance equation is as follows:

$$R \cdot Ff \cdot \cos\alpha - R \cdot Fo \cdot \cos\alpha + T = \mu \cdot r \cdot N1 + \mu \cdot r \cdot N2 \quad \text{(moment)},$$

where

θf: the angle made by the feeding roller gear and the idler gear horizontal line;
θo: the angle made by the discharge roller gear and the idler gear horizontal line;
Ff: the input load from the conveyance roller;
Fo: the load of the discharge roller;
T: the moment of inertia of the idler gear;
N1: the perpendicular reaction at the support shaft protrusion 4b;
N2: the perpendicular reaction at the support shaft protrusion 4c;
F1: the frictional force at the support shaft protrusion 4b ($=\mu \cdot N1$);
F2: the frictional force at the support shaft protrusion 4c ($=\mu \cdot N2$);
θ1: the angle made by the support shaft protrusion 4b and the idler gear horizontal line;
θ2: the angle made by the support shaft protrusion 4c and the idler gear horizontal line;
α: the gear pressure angle;
R: the gear pitch circle radius;
r: the idler gear bearing portion inner diameter;
μ: the coefficient of friction between the idler gear and the support shaft;
θ3: the angle made by the support shaft protrusion 4d and the idler gear horizontal line; and
θ4: the angle made by the support shaft protrusion 4e and the idler gear horizontal line.

By solving the above three equations on the condition that the perpendicular reactions N1 and N2 acting on the protrusions 4b and 4c of the support shaft 4 are of the same value, it is possible to calculate the relation of the optimum angles θ1 and θ2 with respect to the perpendicular reaction N1 (=N2). The reason for making the perpendicular reactions N1 and N2 of the same value is to stabilize the attitude through uniform load and to make the wear uniform in terms of durability.

Under the condition where the perpendicular reactions N1 and N2 are equal to each other, the angle difference between θ1 and θ2 is fixed. As a result, the total load exerted on the idler gear 210 is uniformly distributed between the protrusions 4b and 4c.

When the angles θ1 and θ2 increase, the perpendicular reaction N1 (=N2) decreases. Conversely, when the angles θ1 and θ2 decrease, the perpendicular reaction N1 (=N2) increases. When the former is adopted, a reduction in wear can be achieved, whereas when the latter is adopted, it is possible to further stabilize the gear.

That is, it is possible to determine an optimum angle while taking into consideration the balance between wear and gear stabilization. In this way, even if the positions of the protrusions 4b and 4c supporting the idler gear 210 are changed, there is no great change in the configuration of the support shaft 4, so that the strength of the support shaft 4 is not reduced.

It is possible to calculate ideal values of the angles θ1 and θ2 by using the above equations. However, from the viewpoint of practical use, there is no problem so long as the difference between the perpendicular reaction N1 acting on the idler gear 210 from the protrusion 4b and the perpendicular reaction N2 acting on the idler gear 210 from the protrusion 4c does not become extremely large.

That is, it is only necessary for the inner peripheral surface 210a of the shaft hole of the idler gear 210 to be pressed against both the protrusion 4b and the protrusion 4c by the force Ff the idler gear 210 receives from the conveyance roller gear 204 and the force Fo the idler gear 210 receives from the discharge roller 208.

Alternatively, the resultant force of the force Ff received from the conveyance roller gear 204 and the force Fo received from the discharge roller gear 208, as drawn from the rotation center of the idler gear 210, may be between directions of the forces acting on the protrusions 4b and 4c from the inner peripheral surface of the shaft hole of the idler gear (in directions opposite to the perpendicular reactions N1 and N2).

Further, it is also possible for the angles θ1 and θ2 to be determined so that when the resultant force vector of the force Ff the idler gear 210 receives from the conveyance roller gear 204 and the force Fo the idler gear 210 receives from the discharge roller gear 208 is drawn from the rotation center of the idler gear 210, the angle made by the resultant force vector and the reaction N1, and the angle made by the resultant force vector and the reaction N2 are equal or substantially equal to each other.

Next, when the conveyance roller gear is caused to make reverse rotation, the forces Ff and Fo are exerted in opposite directions, so that the idler gear 210 moves in the normal Y-direction, and is brought into contact with the protrusions 4d and 4e. Regarding the arrangement angles (θ3 and θ4) of the protrusions 4d and 4e, they can be similarly obtained from the above-described balance between the force and moment.

In this case, the idler gear 210 may move from the above-described predetermined position. However, by making the gap d1 between the inner peripheral surface 210a of the idler gear 210 and the protrusion 4d, and the gap d2 between the inner peripheral surface and protrusion 4e gaps equal to the fit-engagement tolerance between an ordinary round shaft and hole, it is possible to keep the deviation of the rotation center of the idler gear 210 at substantially the same level as in the case of a round shaft.

In the recording apparatus according to the present exemplary embodiment, no recording is performed while rotating the conveyance roller 203 in the reverse direction, and the requisite conveyance accuracy, that is, the transmission accuracy required for the gear train is not high, so that the arrangement as described above is adopted. In other words, the protrusions held in contact with the normal direction, of which high transmission accuracy is required, are formed in conformity with the above-described predetermined position of the idler gear, and the protrusions held in contact in the reverse direction, that is, in a direction requiring low transmission accuracy, are formed so as to be spaced away from each other.

Figure 5:
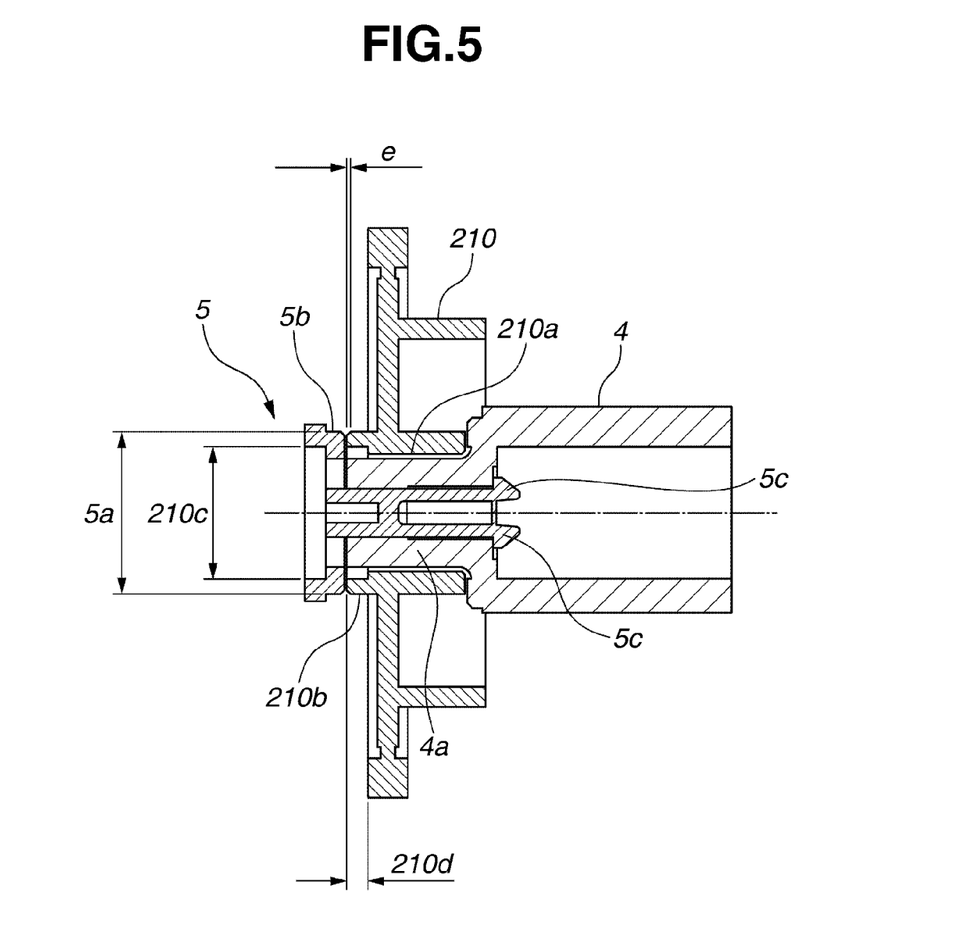
FIG. 5 is a sectional view of an idler gear and a support shaft.

FIG. 5 is a sectional view of the idler gear and the support shaft. The idler gear 210 is provided with a cylindrical portion 210b. In the inner periphery of the cylindrical portion 210b, there is provided, in a length 210d, a stepped portion 210c of a somewhat larger diameter than the inner peripheral surface 210a coming into contact with the support shaft 4.

At the distal end portion of the stopper 5, there is formed a cylindrical portion 5b having a diameter 5a somewhat larger than the outer diameter of the cylindrical portion 210b of the idler gear 210, covering the cylindrical portion 210b of the idler gear 210 in the mounted state.

Further, the stopper 5 has a claw portion 5c extending through the support shaft 4 for regulating the axial position. As a result, the axial movement of the idler gear 210 is regulated by the gap e.

With the above-described configuration, when it is necessary to apply lubricant such as grease between the idler gear 210 and the support shaft 4 in order to achieve a reduction in wear, the stepped portion 210c of the idler gear 210 serves as a trapping portion for excessive grease. A disc portion 5c provided on the stopper 5 serves as a shielding plate, making it possible to prevent grease from being scattered to the exterior.

As described above, regarding the configuration of a shaft receiving the inner peripheral surface of an idler gear at two points to stabilize the attitude of the idler gear and to prevent deterioration in transmission accuracy, there is adopted a support shaft configuration for the idler gear in which protrusions protrude from a substantially cylindrical form.

According to another aspect of the present disclosure, the protrusions including curved surfaces protrude from the support shaft, which is of a smaller diameter than the gear bearing portion (the inner peripheral surface), support the gear bearing portion, whereby the attitude of the gear is stabilized, and there is no need to make the shaft extremely thin, making it possible to maintain the requisite shaft strength. As a result, it may be possible to prevent the gear from being deviated from a predetermined position due to deflection of the shaft.

According to another aspect of the present disclosure, the protrusions having curved surfaces internally touching the gear bearing portion are formed, so that it is possible to maintain the bearing angle and gear position as set even if the degree of roundness of the curved surfaces is increased. Further, by increasing the degree of roundness, it is possible to reduce the wear height of the protrusions, and the deviation of the gear from the predetermined position due to wear is reduced, thereby preventing deterioration in gear transmission accuracy.

As a result, the reduction in the strength of the support shaft is suppressed as compared with that in the related art, making it possible to prevent movement of the idler gear from a predetermined position due to axial movement of the idler gear attributable to falling of the support shaft. Thus, in the case where the discharge roller connected with the conveyance roller via the idler gear is controlled based on the detection result of a code wheel provided on the conveyance roller, it is possible to prevent deterioration in transmission accuracy, so that it is possible to realize a still higher level of accuracy in sheet conveyance. In particular, this is more effective when, instead of metal, a molding material is used for the support shaft.

Although in this example the support shaft is formed in a cylindrical configuration, with protrusions inclusive of curved surfaces protruding from the outer peripheral surface thereof, the configuration of the support shaft is not limited to a cylindrical configuration, and it is easily conceivable that there is involved no problem if the configuration of the protrusions includes a flat surface.

Further, although the above description relates to the conveyance unit of a recording apparatus, it goes without saying that the present technique is applicable to any other field where a gear train is used and where high transmission accuracy is required.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-000637 filed Jan. 5, 2011, which is hereby incorporated by reference herein in its entirety.

What is claimed is:

1. A rotary member support apparatus comprising:
a rotary member configured to receive a force in a radial direction and having at a rotation center a cylindrical bearing portion; and
a support shaft inserted into the bearing portion,
wherein the support shaft is formed having a plurality of protrusions, each including curved surfaces internally touching the bearing portion of the rotary member, and
wherein the rotary member is regulated in its movement in an axial direction of the support shaft by a regulation member fixed to the support shaft and formed so as to cover the bearing portion of the rotary member.

2. The rotary member support apparatus according to claim 1, wherein two protrusions among the plurality of protrusions contact the bearing portion of the rotary member at one time.

3. The rotary member support apparatus according to claim 1, wherein the rotary member is a gear arranged between a plurality of gears configured to transmit a driving force, and wherein the gear is an idler gear configured to transmit drive from a first gear connected thereto to a second gear connected thereto, which is rotatable without being fixed in position with respect to the support shaft.

4. The rotary member support apparatus according to claim 1, wherein two protrusions among the plurality of protrusions are configured to come into contact with the bearing portion of the gear in a main rotating direction and are formed so as to come into contact with the bearing portion of the gear at predetermined positions of the gear.

5. The rotary member support apparatus according to claim 4, wherein protrusions among the plurality of protrusions are configured to come into contact with the bearing portion of the gear in a reverse rotating direction and are formed so as to have a predetermined gap between the plurality of protrusions and the bearing portion of the gear when the gear is arranged.

6. The rotary member support apparatus according to claim 1, wherein, of the plurality of protrusions provided on the support shaft, the two protrusions configured to come into contact with the bearing portion of the rotary member at the time of rotation of the rotary member are arranged so as to receive substantially the same load at the time of rotation of the rotary member.

7. The rotary member support apparatus according to claim 1, wherein the support shaft is formed of a molding material.

8. A rotary member support apparatus comprising:
a rotary member configured to receive a force in a radial direction and having a cylindrical bearing portion at a rotation center; and
a support shaft inserted into the bearing portion,
wherein the support shaft has a base portion substantially coaxial with the bearing portion of the rotary member and formed substantially in a columnar configuration of a smaller diameter than an inner diameter of the bearing portion by a predetermined amount, and
wherein a plurality of protrusions integral with the base portion, each including curved surfaces internally touching the bearing portion, are formed, and
wherein the rotary member is regulated in its movement in an axial direction of the support shaft by a regulation member fixed to the support shaft and formed so as to cover the bearing portion of the rotary member.

9. A drive transmission apparatus comprising:
an idler gear configured to transmit a rotational force received from a driving side gear to a driven side gear;
a support shaft extending through a shaft hole of the idler gear and configured to rotatably support the idler gear, and
two protrusions protruding in the outer periphery of the support shaft,
wherein the driving side gear, the driven side gear, and the idler gear are arranged such that a force applied to the idler gear from the driving side gear and a force applied to the idler gear from the driven side gear are exerted to press the inner peripheral surface of the shaft hole of the idler gear against the two protrusions.

10. The drive transmission apparatus according to claim 9, wherein the resultant force of the force applied to the idler gear from the driving side gear and the force applied to the idler gear from the driven side gear is directed between the direction of a force applied to one of the two protrusions and the direction of a force applied to the other of the two protrusions from the inner peripheral surface of the shaft hole of the idler gear.

11. The drive transmission apparatus according to claim 9, wherein an angle made by the direction of the resultant force of the force applied to the idler gear from the driving side gear and the force applied to the idler gear from the driven side gear and the direction of the force applied to one of the two protrusions from the inner peripheral surface of the shaft hole of the idler gear, and the angle made by the direction of the resultant force and the direction of the force applied to the other protrusion from the inner peripheral surface of the shaft hole are substantially equal to each other.

12. The drive transmission apparatus according to claim 9, further comprising two protrusions different from the two protrusions against which the inner peripheral surface of the shaft hole of the idler gear is pressed by the force applied to the idler gear from the driving side gear and the force applied to the idler gear from the driven side gear when the driving side gear is rotated in the reverse direction.

13. The drive transmission apparatus according to claim 9, wherein each of the protrusions includes a semi-cylindrical configuration having a central axis parallel to the central axis of the support shaft.

14. A recording apparatus comprising:
a drive transmission apparatus according to claim 9;
a conveyance unit configured to receive the transmission of a rotational force by the driven side gear; and
a recording unit configured to perform recording on a recording medium conveyed by the conveyance unit.

15. A rotary member supporting apparatus comprising:
a rotary member having a hole; and
a shaft configured to be inserted into the hole to enable the rotary member to be rotatable,
wherein the shaft includes a cylindrical portion and a plurality of protrusions protruding from an outer periphery of the cylindrical portion and lined in a circumferential direction, and supports the rotary member in a manner such that two protrusions among the plurality of protrusions contact an inner peripheral surface of the hole at one time, and
wherein the rotary member receives a force from other component which presses the inner peripheral surface of the hole to the two protrusions.

16. The rotary member supporting apparatus according to claim 15, wherein the shaft is fixed and supports the rotary member in a manner such that the two protrusions simultaneously contact the inner peripheral surface of the hole.

17. The rotary member supporting apparatus according to claim 15, wherein one or more protrusions among the plurality of protrusions other than the two protrusions do not contact the inner peripheral surface.

18. A drive transmission apparatus comprising:
an idler gear having a hole and configured to transmit a rotational force received from a first gear to a second gear; and
a shaft configured to be inserted into the hole to support the idler gear,
wherein the shaft includes a cylindrical portion and a plurality of protrusions protruding from an outer periphery of the cylindrical portion and lined in a circumferential direction, and supports the idler gear in a manner such that two protrusions among the plurality of protrusions contact an inner peripheral surface of the hole at one time, and wherein a resultant force of a force which the idler gear receives from the first gear and a force which the idler gear receives from the second gear is in a direction in which the inner peripheral surface of the hole is pressed to the protrusions.

19. The drive transmission apparatus according to claim 18, wherein the shaft is fixed and supports the idler gear in a manner such that the two protrusions simultaneously contact the inner peripheral surface of the hole.

* * * * *